Dec. 30, 1924.
E. H. EHRMAN
1,521,234
BLANK REGISTERING DEVICE
Filed April 26, 1923
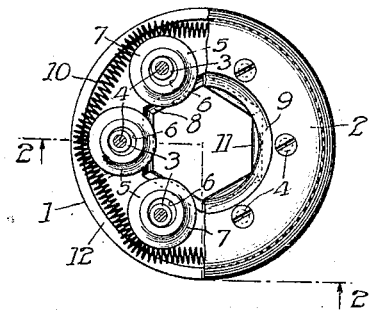
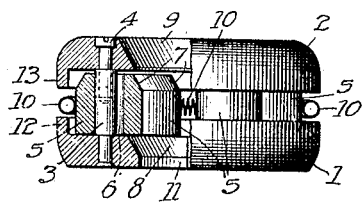
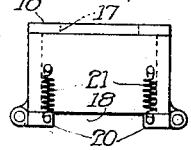
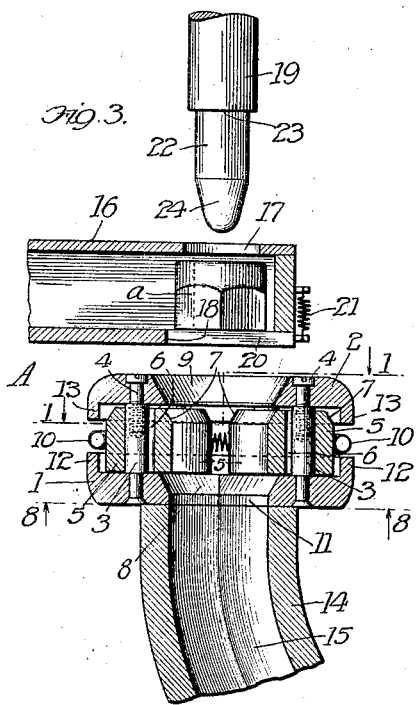
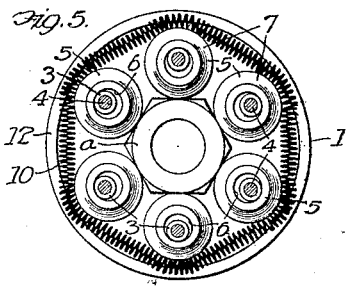
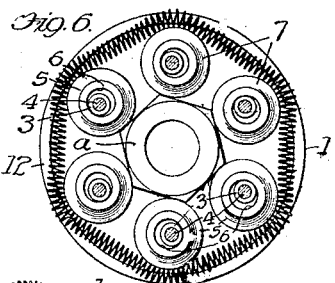
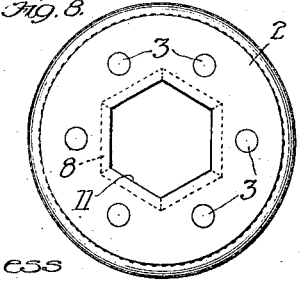
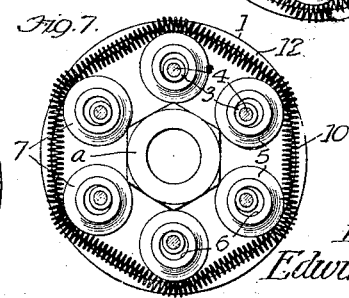
Witness
Martin H. —
Inventor
Edwin H. Ehrman
By —

Patented Dec. 30, 1924.

1,521,234

UNITED STATES PATENT OFFICE.

EDWIN H. EHRMAN, OF OAK PARK, ILLINOIS, ASSIGNOR TO STANDARD SCREW COMPANY, OF JERSEY CITY, NEW JERSEY, A CORPORATION OF NEW JERSEY.

BLANK-REGISTERING DEVICE.

Application filed April 26, 1923. Serial No. 634,920.

*To all whom it may concern:*

Be it known that I, EDWIN H. EHRMAN, a citizen of the United States, and a resident of Oak Park, in the county of Cook and State of Illinois, have invented an Improved Blank-Registering Device, of which the following is a specification.

This invention relates to blank registering devices and has particular reference to devices primarily designed and adapted for registering blanks the lateral faces of which form regular polygons, as for example hexagon nuts.

However, the principles involved in the construction and operation of my improved device admit of a wide range of adaptation and use and, in view of the disclosure of the present application, persons skilled in the art can readily produce devices embodying my invention and improvements adapted for registering other forms of blanks. I do not, therefore, desire to limit the scope of my invention to its use and application for registering regular polygonal blanks or to any particular use or application, but desire and intend to extend the scope of the application and of the patent to be granted therefor to all devices for the general purpose specified embodying in their construction and operation the principles inherent in my invention.

The basic principle inherent in a registering device embodying my invention and improvements is the provision of means acting on the lateral faces or edges of the blanks— specifically the faces of a regular polygon— adapted for rotating the blanks into positions of stable equilibrium relative to the actuating means, registered position of the blanks being coincident with their positions of stable equilibrium.

The object of the invention is to provide a device for the purpose specified, which is simple in construction, strong and durable and which is dependable in operation both as regards accuracy and continuity—that is, which has practically no inherent tendency to become clogged and which may be operated continuously with very little attention on the part of the operator.

To effect the objects of the invention my improved registering device comprises the various features, combinations of features and details of construction hereinafter described and claimed.

In the accompanying drawing, in which my invention is fully illustrated,

Figure 1 is a top plan view, partly in section on the line 1—1 of Fig. 2, of a blank registering device embodying my invention and improvements, Figure 2 is a side view thereof, partly in section on the line 2—2 of Fig. 1, Figure 3 is a diagrammatic sectional side view of a simple form of apparatus embodying a typical adaptation of my improved registering device.

Figure 4 is an end view of the tubular support for containing the blanks to be registered; and Figures 5, 6 and 7 are diagrammatic sectional top plan views with the upper frame member removed, illustrating the manner in which my improved registering device operates.

Figure 8 is a bottom plan view of my improved registering device on the line 8—8 of Fig. 3.

In the accompanying drawings, I have, for purposes of clear and definite illustration, shown a registering device embodying my invention and improvements designated as a whole A, adapted for registering hexagon blanks designated $a$, specifically hexagon nuts.

In what I now consider to be the preferable embodiment of the invention, my improved blank registering device comprises a frame comprising members 1 and 2 rigidly secured together in spaced relation by means of pins 3, an end of each of which is rigidly secured in the frame member 1 and to the opposite ends of which the frame member 2 is secured, preferably in such manner that it may be detached therefrom.

As shown, said pins comprise reduced end portions fitted to holes formed in the frame section 1 and riveted or otherwise rigidly secured thereto, the frame member 2 being secured to the opposite ends of said pins by screws 4, which extend through holes formed in said member 2 and which have screw threaded engagement with holes formed in the ends of said pins.

Rotatably mounted on the pins 3 and confined between the frame members 1 and 2 are rollers 5, said rollers being provided with axial holes or bearings 6 adapted to receive said pins. For reasons presently explained, the bearings 6 are sufficiently larger than the pins 3 to permit desired play of the rollers 5 on said pins transversely to their axes.

The ends of the rollers 5 adjacent to the frame member 2 are tapered, as shown at 7 and formed in the frame members 1 and 2, respectively, are openings 8 and 9, the blanks a being delivered to the registering device through the opening 9, the sides of which converge inwardly and the opening 8 forming the discharge opening for the blanks, the sides thereof converging outwardly.

As shown, there are six pins 3 and rollers 5, the pins being arranged in a circular series concentric with the openings 8 and 9 in the frame members 1 and 2 and at equal angular distances apart, or at angles of 60° from each other.

In accordance with my invention, the rollers 5 are adapted to be maintained yieldingly at the limit of their inward movement by means of a spring ring 10 adjusted over the series of rollers 5. As shown, said spring ring consists of a coiled spring the ends of which are connected together, said spring being of such size and stiffness that when adjusted to the rollers 5, it will maintain said rollers yieldingly at the inner limit of their movement, that is at the limit of their advancement towards each other. Also, the pins 3, rollers 5 and pin bearings 6 in said rollers are so proportioned that when at the limit of their inward movement, the diameter of a circle tangent to said rollers will be a slight fraction of an inch less than the diameter of a circle inscribed within the hexagon blanks a, and the pin bearing 6 in said rollers being made sufficiently large to permit separation of the rollers 5 to a distance slightly greater than the large diameter of said blanks.

At its inner end the blank admission opening 9 is made of such diameter that it will extend inwardly over the tapered ends 7 of the rollers 5, when at the limit of their advancement towards each other, thus insuring that blanks entering the device through said opening will strike the tapered ends of said rollers. At its outer end said opening is sufficiently larger than the largest diameter of the blanks to provide for conveniently inserting the blanks therethrough into engagement with the rollers 5 without danger of their catching on the frame member 2 at the edges of said opening.

The shape in cross section of the discharge opening 8 conforms to the exterior shape of the blanks a which the device is adapted to handle, being shown in the drawings as hexagonal. As previously explained, said discharge opening 8 comprises a flared section, the diameter of the inner end of which is greater than the space defined by the rollers 5 when at the limit of their separation. Said discharge opening also comprises an outer section 11 which is of such size that the blanks a will fit the same with only slight clearance when the blanks a register therewith.

The frame members 1 and 2 project outwardly beyond the outer sides of the rollers 5 and formed thereon, respectively, are marginal flanges 12 and 13 which extend inwardly towards each other and which, in operation, confine the spring ring 10 in adjusted position on the rollers 5, said frame members 2 and 3 being so proportioned that when the rollers 5 are at the limit of their separation, clearance will be provided between the rollers 5 and the interior shoulders formed by the flanges 12 and 13, thus permitting said rollers to turn freely on the pins 3 under all operating conditions.

Referring now to Fig. 3 of the drawings, in which I have indicated diagrammatically, a simple form of apparatus embodying a blank registering device of my invention, my improved registering device A is supported at the upper end of a tube or chute 14 the opening 15 through which conforms both in shape and size to the small outer section of the discharge opening 8 of the registering device. The tube or chute 14 is adapted to receive blanks from the registering device A and to guide them to a desired point of delivery, and to effect this, said registering device and chute are connected with the section 11 of the discharge opening of said registering device in accurate register with the passageway 15 of the chute 14.

The blanks a on which the apparatus is operated, are contained in a tubular support indicated at 16, the discharge end of which terminates above the admission opening 9 of the registering device A, the blanks a being supplied to said tubular support 16 either by hand or by suitable mechanical means, not shown.

The end of the tubular support 16 is closed and formed in opposite walls therewith in substantially axial alignment with the discharge and admission openings 8 and 9 of the registering device are holes or openings 17 and 18 through which a plunger, indicated at 19, is adapted to work, reciprocating movement being imparted to said plunger towards and from the registering device A by suitable means, not shown, but which can readily be supplied by skilled mechanics familiar with the art.

The discharge opening 18 in the side of the tubular support 16 adjacent to the registering device A is larger than the blanks a, and the blanks are prevented from falling through the same by plates 20 hinged to opposite sides of the opening 18 and which are maintained yieldingly closed by springs 21 applied thereto, the closed position of said plates being defined by means of suitable stops.

When in closed position, the plates 20 reduce the width of the opening 18 to a dimension less than the smallest diameter of the blanks $a$.

Blanks $a$ contained in the tubular support 16 are adapted to be ejected therefrom and delivered to the registering device A in the following manner:—At its outer end, the plunger 19 comprises what may be designated as a pilot consisting of a reduced portion 22 which is adapted to enter the holes in the blanks $a$ and which defines a shoulder 23 on said plunger at the inner end of said pilot 22, adapted to contact with the ends of the blanks $a$ at the sides of the holes or openings therein. Also, the extreme end of the pilot 22 is tapered as shown at 24 so that the end of the plunger will enter the holes in the blanks $a$ even though said holes are somewhat out of alignment with said plunger. As the plunger advances, bringing the pilot 22 on the plunger into engagement with the holes in the blanks $a$, the blanks will be brought into substantial register with the plunger 19, the holes 17 and 18 in the tubular support 16 and the admission opening 9 of the registering device, further advancement of said plunger bringing the shoulder 23 into engagement with the top sides of the blanks $a$ around the holes therein, forcing said nuts out of the tubular support 16 past the hinged plates 20 through the admission opening 9 of the registering device and into contact with the tapered ends of the rollers 5 of said registering device. Said blanks will thus exert a wedging action on the rollers 5 which will force them apart and bring the lateral sides of the blanks into engagement with the straight sides of said rollers 5, the spring ring 10 applied to said rollers resisting the spreading action thereof and subjecting a blank positioned between said rollers 5 to substantially radial pressure which, if exerted at points other than the centers of the lateral faces of said blanks will produce a moment tending to turn the blank in a direction to bring the centers of its lateral sides into contact with the rollers 5, that is into positions of stable equilibrium.

The registering action of the rollers 5 on the blanks $a$ is illustrated in Figs. 5, 6 and 7. Fig. 5 shows a blank $a$ in a state of stable equilibrium, with the centers of its lateral sides in contact with the rollers 5, in which position said rollers will exert no turning action on the blanks. In order that the blanks $a$ will be accurately centered when in positions of equilibrium, said blanks $a$, the rollers 5, the pins 3 and the pin bearings 6 in said rollers are so proportioned that when the blanks are in positions of equilibrium, the pins 3 and pin bearings 6 will be in contact with each other at points defined by the intersections of radial lines described through the center of the blank and the centers of the bearing pins 3, respectively, with the sides of the bearing pins and pin bearings remote from the center of said blank. With this construction, it is obvious that the bearing pins 3 will form stops which will limit the approach of the rollers 5 towards each other so as to define an opening equal to the small diameters of the hexagonal portions of the blanks.

Let us assume, however, that a blank is delivered between the rollers 5 by the plunger 19 in the position shown in Fig. 6, in which said rollers bear against the flat sides of the hexagon at points remote from the centers of said sides. With this relation, it is obvious that the pressure of the rollers 5 on the sides of the blank will exert a moment on said blanks tending to turn it into a position of equilibrium, as shown in Fig. 5, in which position it will come to rest.

Again let us assume that a blank is delivered to the registering device in the position shown in Fig. 7, in which position, the angles of the blanks are in alignment with radial lines through the center of the blank and the centers of the bearing pins 3, respectively. In this position it is obvious that a blank would be in very unstable equilibrium and that any slight tendency to rotation of any of the rollers 5 would turn said blank so as to bring the sides thereof into engagement with said rollers and cause it to assume a position of stable equilibrium as shown in Fig. 5.

Such tendency to rotation of one or more of the rollers 5 would be produced by slight variations in the tension of the spring ring 10 upon different rollers from any cause, and, aside from the fact that it is practically impossible that the blanks would be presented to the registering device in the position shown in Fig. 7, it is found in practice that the device uniformly and without fail does operate to turn the blanks into position of stable equilibrium, shown in Fig. 5.

Blanks which are in the registering device at any given time will be ejected therefrom into the chute 14 by succeeding blanks delivered to the registering device A by the plunger 19.

In effecting registration of blanks, the rollers 5 operate with a rolling action both on the faces of the blanks and on the bearing pins 3. Their action will, therefore, be practically without friction and very delicate, so that they will respond very quickly and accurately to almost any variation of blanks from exact registration to accurately register the blanks.

Also, while I have shown my improved device with as many rollers as the polygonal blank has faces, it is obvious that a less number of rollers may be employed, if desired, without affecting results obtained. In fact, the only limitation as regards the number of rollers is that the device shall have a sufficient number of rollers properly arranged to confine the blanks and to register the same in accordance with the principles underlying my invention, as herein explained.

As used in the specification and claims of the present application, "registration" and "stable equilibrium" are used to signify substantial registration or equilibrium, as any slight angular divergence of the blanks from exact registration or a condition of absolutely stable equilibrium will be corrected by the flared inner section of the discharge opening 8 of the device, through which the blanks are delivered to the chute 14.

Also, as an obvious modification of the preferred construction shown, my invention contemplates equally a construction in which the rollers 5 are secured to the pins 3 so as to turn therewith, the projecting ends of the pins being rotatable in bearings formed in the frame members 1 and 2, said pin bearings being sufficiently larger than the ends of the bearing pins to provide for contemplated movement of the rollers transversely of their axes.

I claim—

1. In a device for registering blanks, the combination of a frame, rollers rotatably mounted thereon, in position to engage different sides of a blank forced between them, said rollers being mounted so as to be bodily movable transversely of their axes, means for advancing said rollers yieldingly towards each other, means for limiting the approach of said rollers towards each other, and means rendered operative by forcing a blank between said rollers for subjecting said blank to the pressure sustained by said rollers tending to advance them towards each other, the relation being such that when in positions other than positions of nearest approach, the pressure which they sustain will produce moments tending to turn a blank forced between them into a position of stable equilibrium and when at the limit of their approach defined by said blank, the blank will be in stable equilibrium, and such also that registered position of said blank is coincident with its position of stable equilibrium.

2. A device for registering blanks as specified in claim 1, in which the means for mounting the rollers comprises pins secured in the frame of the device and bearings in the rollers adapted to receive said pins, said bearings being sufficiently larger than the pins to permit contemplated movement of said rollers.

3. A device for registering blanks as specified in claim 1, in which the means for mounting the rollers comprises pins secured in the frame of the device and bearings in the rollers adapted to receive said pins, said bearings being sufficiently larger than the pins to permit contemplated movement of said rollers, and advancement of the rollers towards each other is limited by contact of the bearing pins with the sides of the pin bearings in said rollers, respectively.

4. A device for registering blanks as specified in claim 1, in which the means for advancing said rollers yieldingly towards each other consists of a spring ring which encircles said rollers and which is of such size that it will be under tension in all positions of said rollers.

5. A device for registering blanks as specified in claim 1, in which the ends of the rollers at the admission side of the device are tapered, the relation being such that a blank inserted between said rollers will contact initially with the tapered ends thereof, whereby forcing a blank between said rollers will separate the same.

6. A device for registering blanks as specified in claim 1, in which the ends of the rollers at the admission side of the device are tapered, the relation being such that a blank inserted between said rollers will contact initially with the tapered ends thereof, whereby forcing a blank between said rollers will separate the same, and the frame of the device comprises a member which encloses the tapered ends of the rollers and is provided with a blank admission opening the sides of which converge inwardly, the contracted inner end thereof overlapping the tapered end portions of the rollers when said rollers are at the limit of their advancement towards each other.

7. A device for registering blanks as specified in claim 1, in which the frame of the device comprises a plate on which the rollers are mounted provided with a discharge opening which conforms to the shape of the blanks on which the machine is adapted to operate, said discharge opening comprising an inner section, the sides of which converge outwardly and an outer section only slightly larger than said blanks.

8. In a device for registering blanks the faces of which form regular polygons, the combination of rollers adapted to engage different faces of a blank passing between them, said rollers being positioned at angular distances from each other equal to 360° divided by the number of faces of the blanks to be registered or a multiple thereof, said rollers being mounted so as to be bodily movable transversely of their axes, means for advancing said rollers yieldingly towards each other, and means for limiting the approach of said rollers to each other, the relation being such that when in positions of nearest approach, their axes will be in a common circle and they will define a space of such size that the diameter of a circle inscribed therein tangent to said rollers will be substantially equal to the diameter of a circle inscribed within the polygon formed by the faces of the blank, and means rendered operative by forcing a blank between said rollers for subjecting said blank to the pressure sustained by said rollers tending to advance them towards each other, registered position of said blank being coincident with its position of stable equilibrium.

In witness that I claim the foregoing as my invention, I affix my signature this 11th day of April, 1923.

EDWIN H. EHRMAN